United States Patent [19]

Stamler

[11] 3,772,915

[45] Nov. 20, 1973

[54] DENSITY CORRECTED FLOWMETER

[75] Inventor: Leo Stamler, Plainview, N.Y.

[73] Assignee: Consolidated Airborne Systems, Inc., Carle Place, N.Y.

[22] Filed: Oct. 27, 1970

[21] Appl. No.: 84,286

[52] U.S. Cl............. 73/194 M, 73/113, 235/151.34
[51] Int. Cl.............................................. G01f 1/00
[58] Field of Search..................... 73/231 M, 194 M, 73/112, 113, 114; 235/151.34

[56] References Cited
UNITED STATES PATENTS

| | | | |
|---|---|---|---|
| 3,248,942 | 5/1966 | Cole................................. | 73/231 M |
| 3,635,084 | 1/1972 | Lamphere et al. ............... | 73/194 M |
| 3,537,312 | 11/1970 | Moore.............................. | 73/231 M |
| 3,083,569 | 4/1963 | Thomas et al.................... | 73/194 M |
| 3,385,108 | 5/1968 | Rosso............................... | 73/231 M |
| 2,955,464 | 10/1960 | Elwell................................ | 73/198 |
| 2,982,133 | 5/1961 | Haskell............................. | 73/195 |
| 3,315,524 | 4/1967 | Duffy et al. ..................... | 73/194 M |
| 3,566,685 | 3/1971 | Zimmermal et al. ............. | 73/194 |
| 3,488,996 | 1/1970 | Pfrehm............................. | 73/61.1 |
| 3,610,898 | 10/1971 | Yamamoto..................... | 235/151.34 |

*Primary Examiner*—Jerry W. Myracle
*Attorney*—Leonard H. King

[57] ABSTRACT

A fuel management system capable of indicating the mass fuel flow rate, the total mass of fuel consumed and the hours of flight remaining. The mass fuel flow values are determined by multiplying the volumetric flow rates by the density of the fuel. Temperature correction is provided for determining accurate density values at the location of the volumetric measurement positions. Integration of the mass fuel flow rate provides the total mass fuel consumed.

10 Claims, 5 Drawing Figures

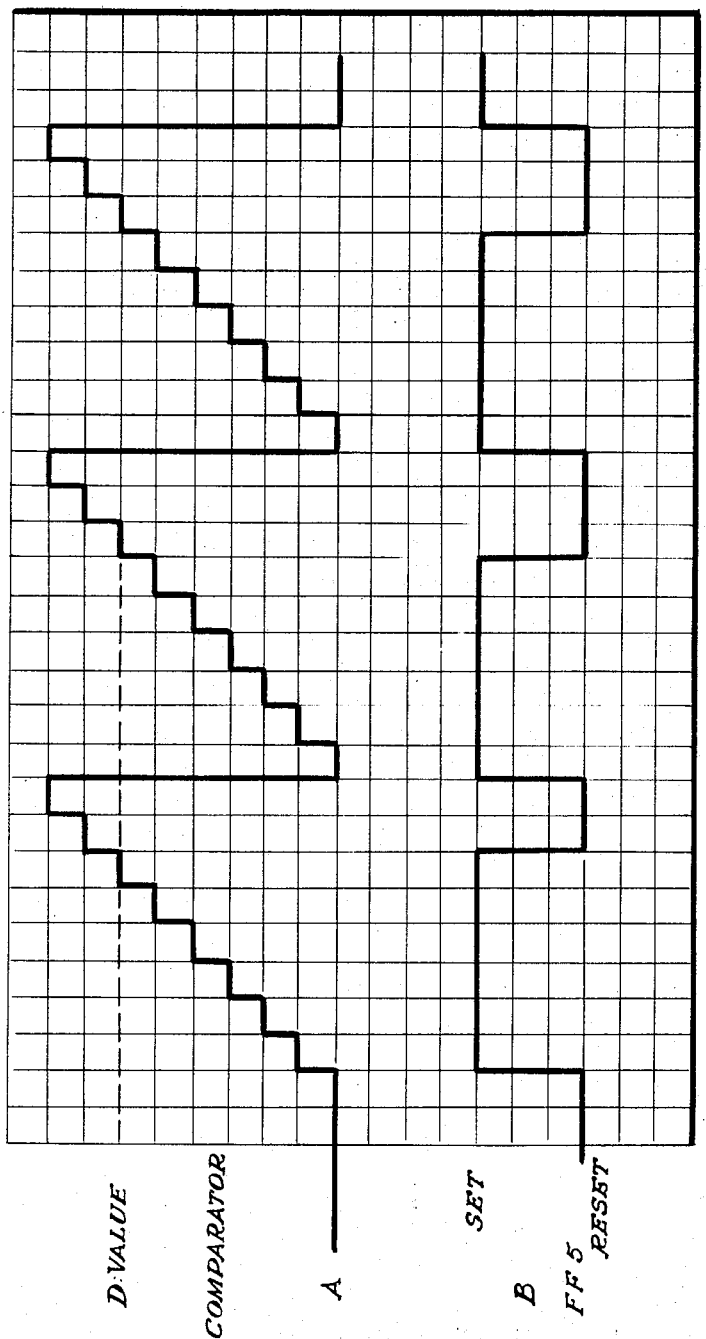

DENSITY CORRECTED FLOWMETER

This invention relates generally to a fuel management system and more particularly to a mass fuel flow system using density correction of volumetric fuel flow rates.

BACKGROUND OF THE INVENTION

As the general aviation industry has developed modern high performance aircraft, there has been an increased demand for new and improved fuel management systems that could contribute to flight safety by providing the pilot with an accurate indication of fuel quantity. While on the ground, it is possible to measure the efficiency of an engine by using external equipment to record thrust, etc. However, the airborne engine can best be judged by knowing its mass fuel flow rate. This measured quantity is closest to the actual available energy flowing to the engine. Furthermore, the mass fuel flow rate can also be used as an indication of the total fuel consumed, and the hours of flight remaining. Prior art systems have used a direct measurement of the mass flow with numerous transducers and readout devices. However, the high cost and complexity of these devices have been major disadvantages to their use.

This invention indicates mass flow rate from the volumetric flow rate by converting it, using the density measurement of the fuel. The volumetric flow rate is generally determined in gallons/hour. Multiplying this quantity by the density in pounds/gallon will indicate the mass fuel flow rate in pounds/hour. The mass fuel flow rate is then integrated to determine the total fuel consumed. Also, by measuring the total fuel quantity and dividing it by the mass fuel flow rate, the number of hours remaining can be obtained. As is known in the art, the dielectric constant of a fluid is related to its density in a known fashion. The density is, therefore, easily determined by measuring the dielectric constant of the fuel and calculating the density from it. In order to maintain the accuracy of the system, the density measurements are temperature corrected to reflect the exact fuel density at the position of the volumetric flow measurement.

Accordingly, it is an object of this invention to provide an accurate and low cost mass fuel flow system.

A further object is to provide an accurate and low cost system for indicating the total fuel consumed.

Yet another object is to provide a fuel management system using density correction of the volumetric fuel flow rate.

Still a further object is to provide a highly accurate measurement of mass fuel flow rate by multiplying the volumetric fuel flow rate by a temperature corrected density measurement.

Another object is to provide a digital integrator for converting the mass fuel flow rate into the total mass fuel consumed.

These and other features of the invention will be apparent from the description heretofore taken in conjunction with the drawings, in which:

BRIEF DESCRIPTION OF THE DRAWINGS

FIGS. 4 and 5 are timing diagrams useful in the explanation of FIG. 3.

Referring now to FIG. 1, the mass fuel flow computer 10 receives its input signals from a dielectric constant sensor 11, indicated as a K sensor, and a number of volumetric flow rate sensors 12, 13. The volumetric sensors are typically turbine flow meters which receive an excitation from an unmodulated carrier source shown as a 40 $KH_z$ generator 14. The rotation of the turbine blades by the flow of fluid, amplitude modulates the carrier producing the modulated signal Fv. The signals are sent to the signal conditioner unit 15 where they are demodulated by demodulators 16, 17. The modulation recovered, it is passed through a frequency to DC converters 18, 19. The DC signal output obtained from each converter is proportional in magnitude to the modulation frequency and hence to the volumetric flow rate.

Figure 1:
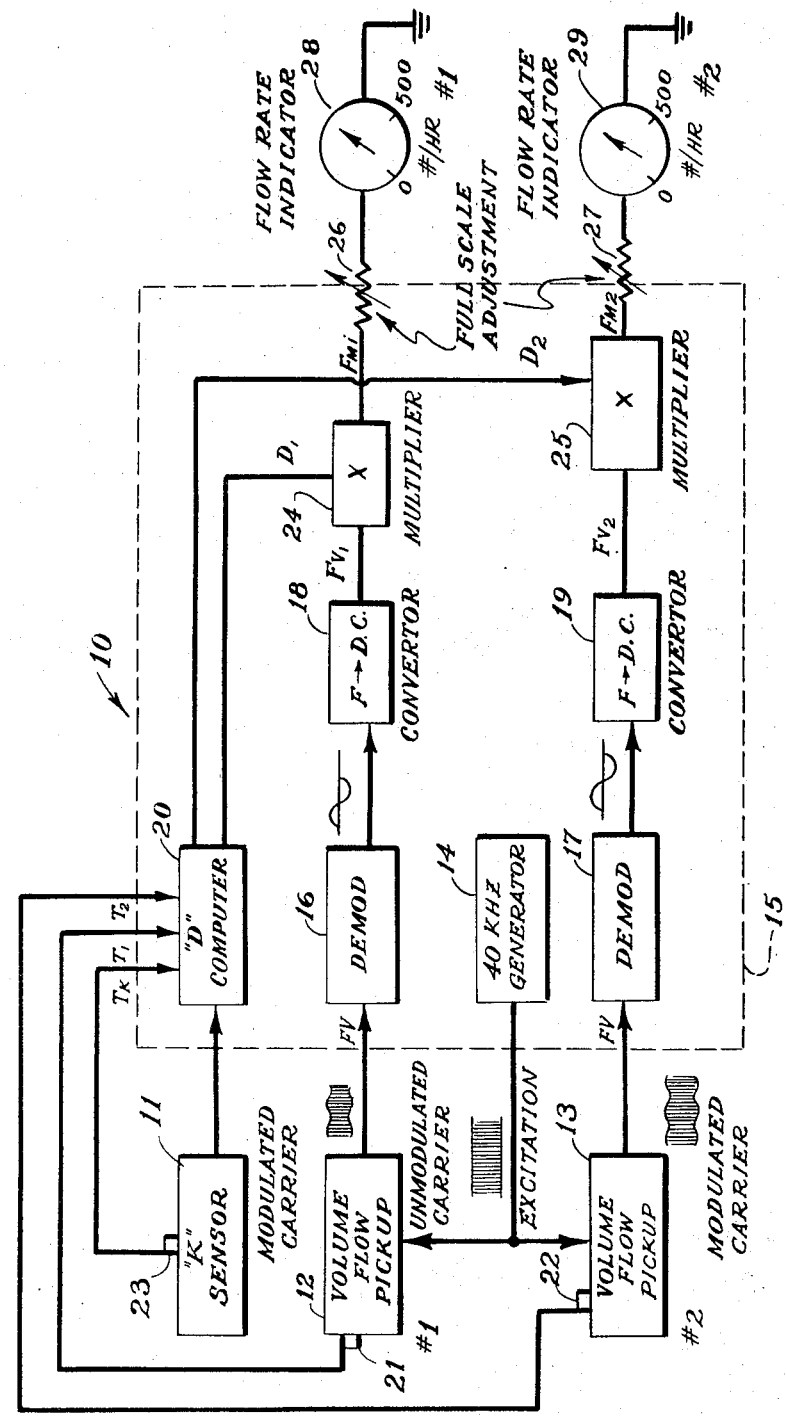
FIG. 1 is a block diagram of the mass fuel flow indication system in accordance with one embodiment of this invention.

The dielectric constant K measured by sensor 11 is sent to the signal conditioner unit 15 where it is acted on by the D computer 20 to calculate the density of the fuel.

Temperature sensors 21 and 22 are placed adjacent to the volumetric sensors 12, 13 and the measured temperatures are applied to the D computer. A temperature sensor 23 is placed adjacent to the K sensor 11 and its measured value is also applied to the D computer 20. Two outputs, D1 and D2 are taken from the D computer. The D1 output and $Fv_1$ form the two inputs to multiplier 24. The D2 output and $Fv_2$ form the two inputs to multiplier 25. The outputs $Fm_1$ and $Fm_2$ pass through variable resistors 26, 27, respectively, which are full scale calibrating adjustment resistors. The mass fuel flow rate is then read out on indicators 28, 29 in terms of pounds/hour.

The theory of operation of FIG. 1 is as follows:

As it has been shown in the prior art, the dielectric constant of a fluid is related to its density in a known fashion. For example, for current jet fuels the known relationship is given as: $(K-1)/D = 0.12192 [1 + 0.3373(K-1)]$ (1)

where K is the dielectric constant of the fluid relative to air and D is the density in pounds per gallon.

It is seen that if a measurement of K is made, a substitution in formula (1) will provide a value for the density D. The volumetric flow rate sensors are placed in the fuel line which feeds each engine. For two engines, two volumetric flow sensors are used as shown in FIG. 1. The volumetric flow rate is an AC signal and is converted to a DC value. With the DC signal available proportional to the volumetric flow rate, it is necessary to multiply the two quantities, the density and the volumetric flow rate, to obtain mass flow rate.

Because the volumetric flow sensors may not be located at the same place as the K sensor, the temperature of the fuel may be different at each of the sensor locations. In order to insure the accuracy of the system, temperature correction is introduced. The "density against temperature" curves of all fuels are very nearly parallel. Therefore, a change in density is proportional to a change in temperature. Temperature sensors are placed at the location of each of the measuring sensors. The temperature at the K sensor is used as the reference temperature and the temperature difference is calculated between the fuel at the K sensor and the fuel at each of the volumetric sensors. Each temperature difference is then multiplied by the correction constant to calculate a corrected density value for each volumetric sensor. Thus, the $D_1$ value of density represents the density of the fuel at the temperature of the volumetric sensor No. 1, and the density $D_2$ represents the density of the fuel at the volumetric sensor No. 2.

An independent density value is calculated for each volumetric rate sensed and is multiplied by the volumetric rate to determine an independent mass fuel flow rate for each engine. In this way, the efficiency of each engine can be determined independently of the other engines. The temperature sensors are placed in a position where they can sense the temperature of the fuel without actually interfering with the actual flow of the fluid. For example, the temperature sensor may be imbedded in the metal body of the volumetric flow sensor so that the temperature sensed is substantially that of the fuel as it passes through the flow sensor. Where space permits, a separate K sensor may be made integral with each flow sensor, whereupon the need for the temperature sensors is eliminated.

The embodiment shown in FIG. 1 shows volumetric flow sensors which modulate a carrier signal. Sensors could also be used without a carrier wherein the AC signal output of the sensor has its frequency proportioned to the volumetric flow rate.

Figure 2:
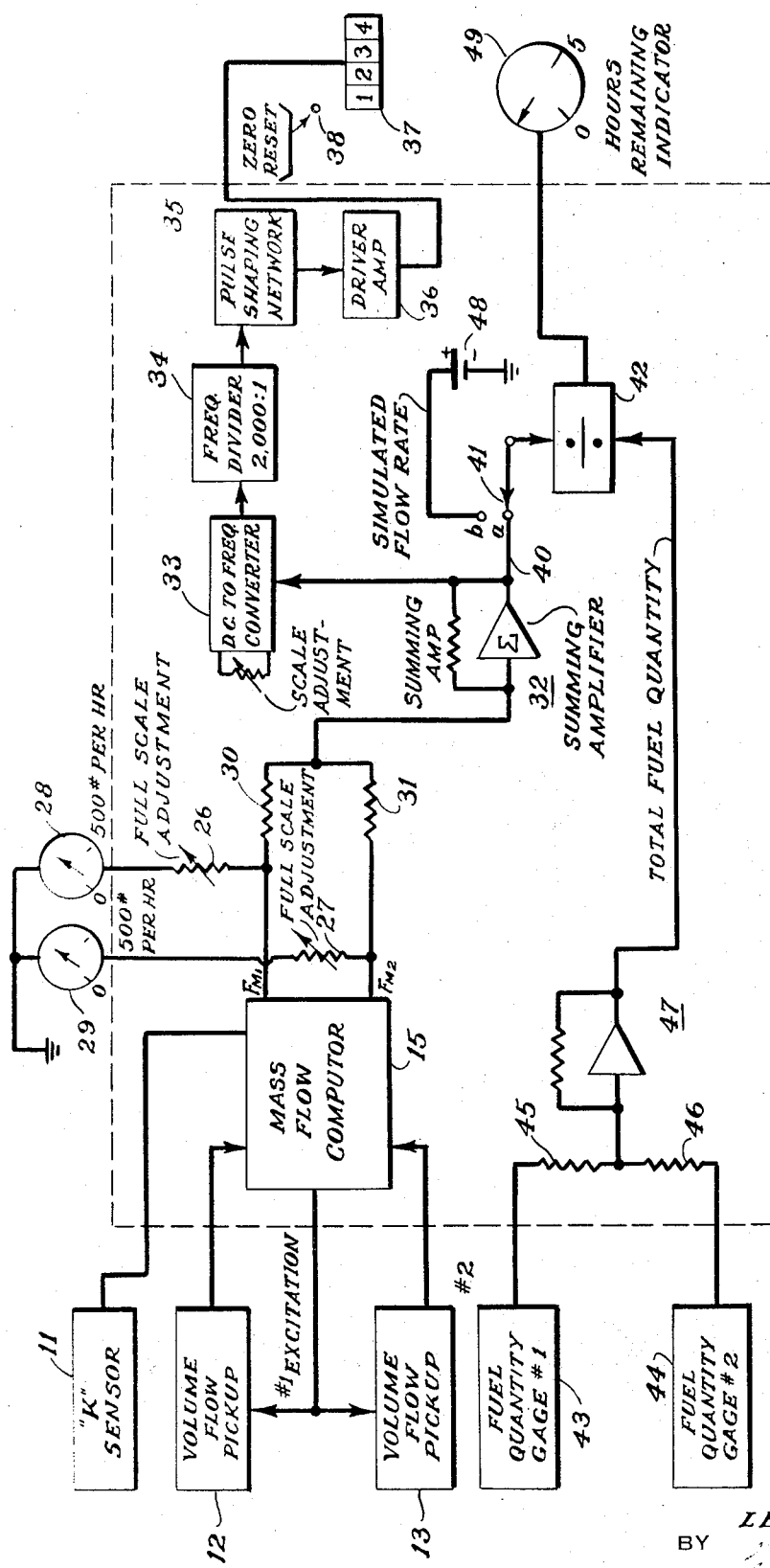
FIG. 2 is a block diagram of a fuel management system indicating mass fuel flow rate, mass total fuel consumed and hours remaining.

FIG. 2 shows an entire fuel management system incorporating the mass fuel flow rate system of FIG. 1 and in which like items from FIG. 1 are numbered the same. The inputs to the fuel management system are the dielectric constant from the K sensor 11, and the volumetric flow rate of the fuel into each engine from the volumetric sensors 12, 13. The temperature sensors used for temperature compensation are not shown, although they could be added as described in connection with FIG. 1. The measured values are fed into the signal conditioners, shown here as a single block labeled "mass flow computer," and the outputs are applied to the mass fuel flow indicators 28, 29, as in FIG. 1.

The outputs are simultaneously taken through resistors 30, 31, respectively, to a summing amplifier 32 where they are added together. The summing amplifier 32 combines the DC potentials $Fm_1$ and $Fm_2$ to form the signal FMT whose magnitude is proportional to the total mass flow rate. The signal is applied to a DC to frequency converter 33 capable of supplying a constant amplitude output waveform at a frequency proportional to the total flow rate, FMT. For a typical total flow rate of 720 pounds/hour, an output frequency of 2,000 $H_z$ is generated. The frequency obtained is divided down through four decades to obtain a pulse rate of 0.2$H_z$ or 720 pulses per hour which is then shaped in pulse shaping network 35 to provide an optimum pulse width for operating an impulse counter. The pulses are applied to the counter 37. At the start-up of operation, a mechanical zero reset 38 is used to start the counter operating from a zero reading. An appropriate scale divider may be used in conjunction with the counter to adjust for the counter capacity. Also, a scale adjuster 39 is used to set the proper scale on the DC to frequency converter 33.

In effect, the total fuel consumed is determined by integrating the total fuel rate. Practically, this is accomplished by means of the counter. The total fuel rate is, therefore, converted from a DC value to a series of equal pulses whose pulse rate is proportional to the flow rate. The pulses are then counted, thereby indicating the total fuel consumed.

Referring again to FIG. 2, a second output from the summing amplifier 32 is taken on line 40 through switch 41 and is applied to divider network 42. The total fuel quantity used by each engine is measured by fuel quantity gages 43, 44, each placed in association with one of the engines. The measured values of the fuel gages are passed through resistors 45, 46, respectively, added together by summing amplifier 47 and applied to the divider network 42. The total fuel quantity is divided by the total fuel flow rate, FMT, to obtain the number of fuel hours remaining. This value is indicated on meter 49.

When switch 41 is in position $a$, the actual burning rate output from summing amplifier 32 is used as the divisor. When switch 41 is in position $b$, a simulated fixed rate is used as the divisor from a simulated source 48. The purpose of the simulated fixed rate is to take care of those situations such as taxiing or holding patterns where the actual burning rate would give an erroneous impression of the hours actually available for flight at normal cruise power settings. Putting switch 41 into position $b$, introduces the constant simulated rate as the divisor. This rate is fixed equal to that which would be obtained from the actual flow rate position, if a flow rate equal to normal cruise conditions were experienced.

A knowledge of the ground speed would enable the pilot to compute the available range at the present power setting by multiplying his ground speed by the hours remaining indication.

Figure 3:
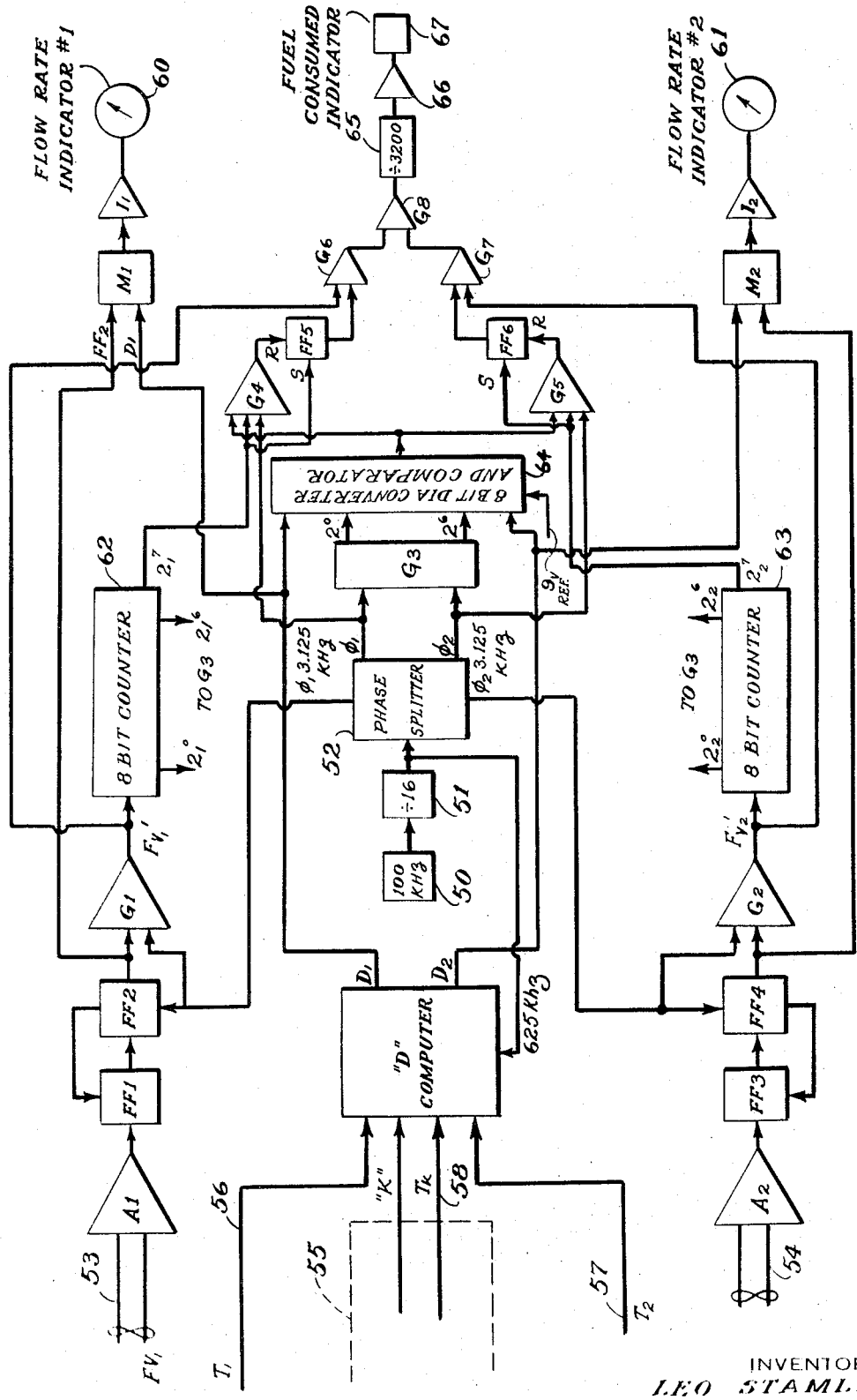
FIG. 3 is a logic diagram of a digital embodiment of a fuel management system in accordance with this invention.

FIG. 3 shows another embodiment of a fuel management system using digital rather than analog components. In the embodiment shown, the system is capable of indicating the mass fuel flow rate and the total pounds of fuel consumed.

An accurate 100 $KH_z$ crystal oscillator 50 is used as a controlled stable clock. The pulse output from the clock is divided by 16 in divider 51 into a 6.25 $KH_z$ pulse. It is then phase split by phase splitter 52 into two pulse signals $\phi_1$, $\phi_2$ of 3.125 $KH_z$ each being 180° out of phase.

The inputs to the fuel management system are provided as before by volumetric sensors 53, 54 each placed in the line feeding one of the engines. The volumetric sensors used produce an AC signal whose frequency is proportional to the volumetric flow rate. A capacitor 55 located in a fuel cell is used as a K sensor and measures the dielectric constant of the fuel. Temperature sensors 56, 57 are placed adjacent to the volumetric sensors 53, 54, respectively, and temperature sensor 58 is placed adjacent to the fuel cell capacitor 55. The measured values of the dielectric constant as well as the temperature values are fed into D computer 59 which computes the temperature compensated density values of the fuel at the location of the volumetric sensors, as hereinbefore described. The 6.25 $KH_z$ clock pulses from the divider 51 are also fed into the D computer as excitation for the density computing bridge circuit. The density outputs $D_1$ and $D_2$ are D.C. analog voltages resulting from temperature correction of the density measured at the "K-sensor." It is assumed in general that temperatures $T_1$ and $T_2$ are unlike, thus resulting in two different densities, $D_1$ and $D_2$.

Figure 4:
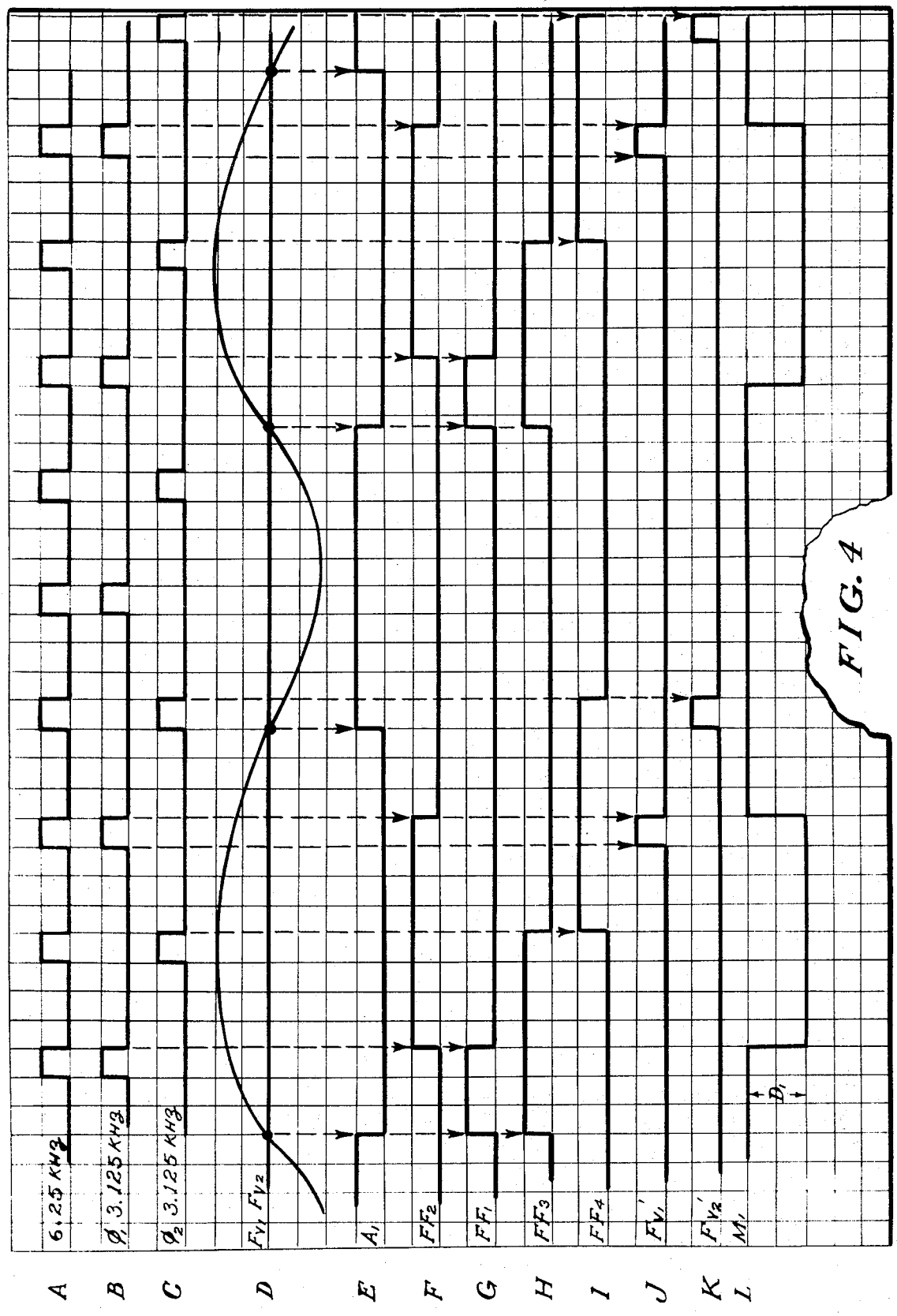

Referring now to FIG. 4, in conjunction with FIG. 3, line A shows the 6.25 KH$_z$ clock pulse from the divided down crystal oscillator 50, and lines B and C show the phase split signals $\phi_1$ and $\phi_2$ at 3.125 KH$_z$ each and 180° apart. Because of the stable oscillator, each of the pulses will have the same pulse width, and the duration between the pulses is fixed at 320$\mu$sec.

Each time the AC signal Fv$_1$ from the volumetric sensor 53 makes a positive going zero crossing, Amplifier A$_1$ (FIG. 3) goes negative and sets FF$_1$, all of which are connected in series. The output of FF$_1$ triggers FF$_2$ together with the clock phase $\phi_1$. The output of FF$_2$ triggers gate G$_1$ and is also fed back to reset FF$_1$. The second $\phi_1$ resets FF$_2$. The results of these steps are that for every positive going zero crossing of Fv$_1$, a pulse is generated by FF$_2$. The duration of the FF$_2$ pulse is 320$\mu$ sec, or the time between successive phase clock pulses. The phase clock pulse $\phi_1$ is gated together with the FF$_2$ pulse into gate G$_1$ producing a single pulse for every positive going zero crossing of Fv$_1$ and whose pulse width is equal to the width of the stable clock pulses. The output pulses of gate G$_1$ are indicated as Fv$_1'$ and are shown in line J of FIG. 4.

The AC signal from the volumetric sensor 54 connected to the other engine causes A$_2$ to go negative for every positive going zero crossing and sets FF$_3$ as shown in H (FIG. 4). The phase clock $\phi_2$ is connected to FF$_4$ and the next negative going edge of $\phi_2$ sets FF$_4$ and resets FF$_3$, as shown in lines H and I. The second $\phi_2$ pulse resets FF$_4$. The results of these steps are that for every positive going zero crossing of Fv$_2$, a pulse is generated by FF$_4$ whose duration is 320$\mu$ sec. The phase clock pulse $\phi_2$ is gated with the FF$_4$ output pulse into gate G$_2$ resulting in a pulse Fv$_2'$ whose pulse width equals the width of the clock pulse and whose frequency is the same as the positive cycles of Fv$_2$. Because the clock pulses are out of phase with each other, the pulses Fv$_1'$ and Fv$_2'$ are out of phase with each other and will never occur simultaneously regardless of the relative phase or frequency of the volumetric sensors.

The output pulses from FF$_2$ together with the D.C. analog voltage representing D$_1$ derived from the D computer 59 are multiplied together in M$_1$. The output is integrated in I, and the results are read on the meter 60 which indicates the mass fuel flow rate in pounds/hour for one engine. Similarly for the other engine, the output pulses from FF$_4$ together with the analog voltage representing density D$_2$ are multiplied together in M$_2$. The output is integrated in I$_2$ and the results are read on meter 61 indicating the mass fuel flow rate in pounds/hour for the second engine.

Referring to FIG. 4, it is seen that the FF$_2$ pulses (line F) have a fixed pulse width of 320$\mu$ sec and a repetition frequency integrally rated to the frequency of Fv$_1$, the volumetric flow rate. The output from the multiplier M is shown in line L as being a pulse whose height equals the density value D$_1$, whose width is 320 $\mu$ sec and occurs once for each cycle of Fv$_1$.

The theory of operation of this circuit is as follows: As hereinbefore explained, the mass flow rate is determined by multiplying the volumetric flow rate in gallons/sec, by the density in pounds/gallon to produce the desired mass flow rate in pounds/hour. The embodiment of FIG. 1 showed analog values of density and volumetric flow rate and multiplied the two D.C. analog values. FIG. 3 shows a digital approach to this multiplication. The sinusoidal input pulses to the volumetric sensors are reshaped to produce rectangular pulse of constant width having a repetition frequency equal to the input frequency. This pulse is then used to open (gate) a switch connected to the D.C. analog of density, resulting in a pulse of constant width and variable height, that height being a function of density. The area of the pulse, i.e., the height proportional to density multiplied by the constant pulse width is proportional to density. Since the pulse repetition frequency is proportional to the volumetric flow rate, the integral is proportional to the desired mass flow rate. To achieve a high order of accuracy, the pulse width is made very constant and the pulse repetition rate is made a function of the volumetric flow rate. The relationship between the volumetric flow rate and the pulse repetition can be expressed as:

$$Fv = f/k \qquad (2)$$

where F$_v$ is the volumetric flow rate in gal/sec
f is the frequency of the pulses in cycles/sec
and k is a proportionality constant in cycles/gal.

In multiplier M, the fixed width pulses from FF$_2$ are multiplied by the D.C. analog of density. The average output value is:

$$M \text{ out} = DfT \qquad (3)$$

where D is the density,
f is the frequency, and
T is the pulse width which is a constant 320 $\mu$ sec.

Substituting equation 2 into equation 3, we obtain:

$$M \text{ out} = D\,F_v\,(TK) \qquad (4)$$

Thus, the average output value from the multiplier is directly proportional to the product of the density and the volumetric flow rate which is the desired mass flow rate.

The pulse train integrated to obtain the average value so that it can be applied to an analog indicator as shown in FIG. 3. However, it is understood that the readout could also be done in servometric devices including pointers, in-line numeric displays, tapes, etc. or digital devices such as Nixie tubes, incandescents, magnetic wheels, etc. Also, the output could be provided in digital format suitable for direct use in computers.

Although rectangular clock pulses are described in FIG. 3, other curves could also be used to give an accurate constant width. For example, an exponential curve could be used with a small time constant to make sure that one pulse dies out before the next starts. Also, ramp functions could be used.

Referring again to FIG. 3, the total pounds of fuel indication will now be explained. The Fv$_1'$ output from gate G$_1$ is fed into an 8 bit counter 62. Similarly the Fv$_2'$ output is fed into counter 63.

The count from the counters 62 and 63 are gated through gate G$_3$ by the phase clock pulses $\phi_1$ and $\phi_2$ into the 8 bit digital to analog converter and comparator 64. Because the phase clock pulses $\phi_1$ and $\phi_2$ are out of phase with each other, the comparator can be time shared by the two separate counters 62 and 63.

The D.C. analogs of density $D_1$ and $D_2$ form the other inputs to the comparator 64. The binary count of counter 62 is converted in staircase fashion into a ramp function and compared with the value of $D_1$. Similarly the binary count of counter 63 is converted into a ramp function and compared with $D_2$. When coincidence is detected, a pulse is sent out from the comparator 64.

Gate $G_4$ has as its inputs, the output from comparator 64, a positive signal from the most significant bit, $2^7$ of counter 62 and the $\phi_1$ clock pulse. Thus, when the most significant bit is a "one" and the comparator 64 has noted a coincidence between $D_1$ and counter 62, at the next $\phi_1$ clock pulse gate $G_4$ will provide an output pulse.

Similarly, gate $G_5$ has as its inputs the output from comparator 64, the most significant bit $2^7$ from counter 63 and clock pulse $\phi_2$. Thus, when the most significant bit is a one and the comparator 64 has noted a coincidence between $D_1$ and the counter 62, at the next $\phi_2$ clock pulse gate $G_5$ will provide an output pulse.

Flip-flop FF5 is set when counter 62 is clocked into the zero state. This occurs when the most significant bit $2^7$ goes negative. Likewise flip-flop FF6 is set when counter 63 is clocked into the zero state. Flip-flop FF5 is reset by the output pulse from gate $G_4$ and flip-flop FF6 is reset by the output from gate $G_5$.

The pulses $Fv_1'$ is gated together with the output from $FF_5$ into Gate $G_6$. The pulses $Fv_2'$ is gated together with the output from FF6 into Gate $G_7$. The outputs from these gates are further gated together through gate $G_8$ which feeds a divide by 3200 counter 65. The output of counter 65 feeds a solenoid driver 66 which controls the readout counter 67 indicating the count of the total pounds of fuel consumed.

The volumetric sensors produce a frequency rate proportional to volumetric flow rate. In the example of FIG. 3 the factor is 28,800 pulses/gallon. The density of the fuels under consideration are generally more than 4.5 pounds/gallon and less than 9 pounds/gallon. Assuming the maximum density, the output would be 3200 pulses/pound. If the fuel had maximum density it would only be necessary to divide the number of volumetric pulses by 3,200 and you would have the total number of pounds. If the density is less than 9 pounds/gal. instead of recomputing a new scale factor, it is preferable to gate out a proportionate number of pulses and retain the same scale factors. In order to remove these pulses, the embodiment of FIG. 3 creates a gate whose width is proportional to density and only passes pulses through the gate when the gate is on and stops pulses when the gate is off. To create the gate width proportional to density, an equivalent staircase generator is used to generate an increasing voltage which is compared with the DC density value. At coincidence a gate is generated proportional to the density. The number of pulses which now pass will be proportional to the mass of fuel consumed.

Referring to FIG. 5, in conjunction with FIG. 3, the counters 62, 63 generate a pulse count which is converted into a staircase voltage by the D/A converter 64. This is shown on line A. At each phase clock pulse the staircase voltage is compared with the DC density value by comparator 64. Simultaneous with the beginning of the count in counters 62, 63 flip-flop FF5 and FF6 are respectively set, as shown on line B. The coincidence of values in comparator 64 causes the flip-flops FF5 and FF6 to reset. Thus, the output from the flip-flops FF5 and FF6 are pulses whose width is proportional to the density. These gating pulses are combined with the volumetric flow rate pulses Fv and only pass the Fv pulse when the gates from FF5 and FF6 are on.

Using the values of this embodiment, the maximum density of the fuels used is 9 pounds/gallon. Accordingly, a 9 volt reference signal is applied to the comparator 64 to establish a scale factor where 1 volt equals a density of 1 pound/gallon.

Since the densities are between 4.5 and 9 pounds/gallon, the staircase voltage will always be between 4.5 and 9 volts before coincidence occurs. This will be in the upper half of the staircase generator. Thus, the counters $C_1$ and $C_2$ will be passed mid scale, or when the most significant bit 2 goes positive, before coincidence occurs. This is assured by requiring the positive signal from the $2^7$ bit of the counters as an input to gates $G_4$ and $G_5$. Because of this type of logic arrangement, the resolution is doubled compared to looking for coincidence when the counters are near zero.

There has herein been described a fuel management system capable of indicating specifically the mass fuel flow rate, the total mass of fuel consumed and the hours of flight remaining. The basic mass fuel flow values are not measured directly but the volumetric flow rates are converted by multiplying them by the density of the fuel. While specific embodiments of this invention have been described, it will be understood that modifications can be made by those skilled in the art and the invention is not to be limited by the specific examples described.

What I claim as new and desire to secure by Letters Patent is:

1. A mass fuel flow system for engines comprising:
   a. density sensing means including means for measuring the dielectric constant of the fluid;
   b. volumetric flow sensing means which provides a modulated signal whose modulation is proportional to the volumetric flow rate;
   c. signal conditioner means including:
      1. computational means for calculating the density of the fluid from the dielectric constant using a predetermined relationship, said calculated density being a D.C. value;
      2. demodulation means for detecting the modulation from the volumetric flow sensing means;
      3. converter means for changing said modulation to a proportional D.C. value; and
      4. analog multiplying means for multiplying said two D.C. values, and
   d. indicator means for indicating the output value.

2. A mass fuel flow system as in claim 1, further comprising first temperature sensing means associated with said dielectric constant measuring means, second temperature sensing means associated with said volumetric flow means, and said computational means further comprises means for temperature correcting said calculated density to reflect the fuel density value at the location of said volumetric flow sensing means.

3. A system as in claim 2 wherein said volumetric flow sensing means comprises a plurality of volumetric sensors each associated with an individual engine, said second temperature sensing means comprises a plurality of temperature sensors each associated with an individual volumetric sensor, and said computational means provides a temperature corrected density value for each of said sensors.

4. A system as in claim 1 further comprising integrating means acting upon the multiplied product output of said signal conditioner.

5. A system as in claim 4 wherein said integrating means comprises converter means for converting said output value into a proportional frequency, pulse shaping means for shaping said frequency into a series of pulses and counting means for counting said series of pulses.

6. A mass fuel flow system for engines comprising:
density sensing means;
volumetric flow sensing means;
signal conditioner means including means for multiplying a signal proportional to the density and a signal proportional to the volumetric flow rate;
indicator means for indicating the output value, fuel quantity measuring means;
divider means wherein said fuel quantity is divided by said multiplied product;
switch means; and
a simulated reference value, wherein said switch means can connect said multiplied product as the divisor or said simulated reference as the divisor.

7. A mass fuel flow system for engines comprising:
a. density sensing means providing a D.C. value proportional to the density;
b. volumetric flow sensing means providing an A.C. signal whose frequency is proportional to the volumetric flow rate;
c. signal condition means including:
   1. means for providing pulses of fixed width whose rate of repetition is proportional to said A.C. signal frequency; and
   2. multiplying means modifying said last mentioned pulses such that their height is proportional to said D.C. value;
d. indicator means for indicating the output value; and
e. mass consumed means including:
   1. conversion means for scaling the number of said pulses of fixed width to a second number;
   2. means for counting said second number of pulses; and
   3. means for forming a gate pulse whose width is proportional to the density value such that said pulse of fixed width can only be scaled when said gate pulse is on.

8. A system as in claim 7 wherein said means for forming a gate pulse comprises staircase voltage generator means, comparison means and gating means, wherein said gating means is turned on when the staircase voltage begins ascending and is turned off when the comparison means detects coincidence.

9. A system as in claim 8 wherein said gating means is turned on only during the upper half of the ascending staircase voltage.

10. A system as in claim 7 wherein said pulses of fixed width are provided by a stable crystal oscillator and are rectangular pulses.

* * * * *